United States Patent
Kudou et al.

[11] Patent Number: 5,873,344
[45] Date of Patent: Feb. 23, 1999

[54] DIRECT FUEL INJECTION IGNITION ENGINE

[75] Inventors: Hidetoshi Kudou, Higashi-Hiroshima; Hiroyuki Yamashita, Hiroshima; Noriyuki Ota, Hiroshima; Masashi Marubara, Hiroshima; Akira Kageyama, Hiroshima, all of Japan

[73] Assignee: Mazda Motor Corporation, Hiroshima-ken, Japan

[21] Appl. No.: 67,286

[22] Filed: Apr. 27, 1998

[30] Foreign Application Priority Data

Apr. 28, 1997 [JP] Japan ................................. 9-111609

[51] Int. Cl.[6] .............................. F02B 31/06; F02B 31/08
[52] U.S. Cl. ...................... 123/295; 123/301; 123/307; 123/308
[58] Field of Search .................................. 123/295, 301, 123/305, 308, 306, 307

[56] References Cited

U.S. PATENT DOCUMENTS

| | | | |
|---|---|---|---|
| 5,669,348 | 9/1997 | Nishigaki et al. | 123/308 |
| 5,671,712 | 9/1997 | Uchida | 123/308 |
| 5,676,107 | 10/1997 | Yuzuriha et al. | 123/308 |
| 5,720,259 | 2/1998 | Sakurai et al. | 123/308 |
| 5,799,638 | 9/1998 | Tsuchida et al. | 123/308 |

FOREIGN PATENT DOCUMENTS 7-286520 10/1995 Japan .............................. F02B 23/10

*Primary Examiner*—Erick R. Solis
*Attorney, Agent, or Firm*—Sidley & Austin; Hugh A. Abrams

[57] ABSTRACT

A direct injection ignition engine includes a piston with a cavity on a top surface thereof, an injector arranged at a peripheral portion of a combustion chamber to be faced to the combustion chamber for injecting a fuel directly into the combustion chamber, an ignition plug arranged to be projected to the combustion chamber for igniting the fuel introduced into the combustion chamber, an intake passage connected to the combustion chamber for introducing an intake air to the combustion chamber, intake air flow control valve arranged in the intake passage for controlling an intake air flow of an inclined vortex including a tumble component and swirl component produced in the combustion chamber, an actuator for driving the control valve, engine load detecting sensor for detecting an engine load, engine speed detecting sensor for detecting an engine speed, fuel supply controller, based on the output signals from the engine load detecting sensor and the engine speed detecting sensor, for producing control signals for the injector which include a fuel injection amount and fuel injection timing in a compression stroke for accomplishing a stratified combustion condition in which an air fuel mixture with an air fuel ratio greater than a theoretical one is concentrated around the ignition plug when an operating condition is in at least a low engine load and low engine speed condition, and, the fuel injection amount and fuel injection timing in an intake stroke for accomplishing a uniform combustion condition in which an air fuel mixture with an air fuel ratio greater than a theoretical one is uniformly and entirely dispersed in the combustion chamber when the operating condition is at least in a condition beyond said low engine load and engine speed condition with regard to the engine load and engine speed, and, producing control signals for the actuator to produce the inclined vortex of the air fuel mixture in the operating condition from the stratified combustion condition to the uniform combustion condition.

19 Claims, 14 Drawing Sheets

(a)

(b)

(c)

(d)

(e)

DIRECT FUEL INJECTION IGNITION ENGINE

BACKGROUND OF THE INVENTION

1. Field of the Invention

The present invention relates to a direct fuel injection ignition engine in which a cavity is formed on a top of a piston and a fuel injector which injects a fuel directly into an engine combustion chamber is disposed on a peripheral portion of an ignition chamber.

2. Related Art

Conventionally, as shown in Japanese Patent Un-examined Application Publication No.7-286520, a direct fuel injection ignition engine has been known that an ignition plug is disposed in a middle portion of a combustion chamber and that an injector is disposed at a peripheral portion of the combustion chamber so as to inject a fuel directly into the combustion chamber. In this type of engine, the injector is disposed at the peripheral portion of the combustion chamber so that the fuel is injected obliquely downwardly toward the piston top. When the fuel is injected in a compression stroke, the fuel reflected on the top surface of the piston is provided around the ignition plug to accomplish a stratification combustion and when the fuel injection is made during an intake stroke, an air fuel combustion gas is dispersed in the whole combustion chamber to accomplish a uniform combustion.

A control has been done in a manner that a fuel injection pattern is changed in accordance with an operating condition. For example, a stratified combustion is made on a low engine load and low engine speed condition through a compression stroke injection in which the fuel injection is made during the engine compression stroke. The fuel injection is made during the intake stroke when the operating condition is in a high engine load and/or a high engine speed condition. In addition, an air fuel ratio is controlled in accordance with the fuel injection pattern control. For example, the air fuel ratio is controlled to provide a lean air fuel mixture when the stratified combustion is executed. The air fuel ratio is controlled to provide a lean air fuel mixture in a lower engine load condition in the case where the uniform combustion is established while the air fuel ratio is controlled to provide a rich air fuel mixture in a high engine load condition.

It is proposed that a cavity is formed on the top of the piston in order to facilitate the stratification so that the fuel injected in the compression stroke is introduced to the ignition plug by way of the cavity.

However, in the conventional engine, there has been a problem that when an inclination angle of the injector to a plane perpendicular to an axis of a cylinder bore is too small, a significant amount of the fuel injected from the injector is not trapped in the cavity and dispersed outside of the cavity of the top surface of the piston resulting in a deterioration of a fuel combustion efficiency and combustion stability. In addition, when the uniform combustion is executed in the intake stroke injection, the amount of the fuel attached to a cylinder wall surface is increased to increase the amount of hydrocarbon emission and incur a dilution of a lubrication oil.

If the inclination angle of the injector is increased, the above problem is eliminated. However, if the inclination angle is increased, it would be difficult to form properly intake ports due to the interference with the injector. Thus, the increase of the inclination angle of the injector is impossible due to the above problem in layout.

In order to solve the above problem, forming a tumble in the combustion chamber would be effective. The tumble would orient the atomization from the injector downward so that the trapping of the injected fuel by the cavity is facilitated in the course of the stratified combustion. In addition, the amount of the fuel attached to the wall surface of the cylinder can be reduced. However, it is not enough for the tumble to introduce the trapped air fuel mixture to the ignition plug so that the air fuel ratio of the air fuel mixture around the ignition plug becomes unstable. In addition, the tumble component tends to be reduced and collapsed. As a result, the air fuel mixture cannot be properly dispersed in the stratified combustion of a middle engine load condition in which the fuel injection amount is fairly large, and resulting in a deterioration of the fuel consumption efficiency.

Alternatively, it would be proposed that an intake system is constituted to facilitate a swirl. However, the sole swirl formation may produce an inversed stratified condition in which the fuel air fuel mixture is concentrated around the peripheral portion of the combustion chamber rather than around the ignition plug. Thus, the combustion performance cannot be improved.

SUMMARY OF THE INVENTION

Therefore, an object of the invention is to provide a direct injection ignition engine which can improve a combustion performance by making use of the intake gas flow in the stratified combustion condition and the uniform combustion condition when the air fuel ratio provides a lean air fuel mixture The above and other objects of the present invention can be accomplished by a direct injection ignition engine comprising, a piston with a cavity on a top surface thereof, an injector arranged at a peripheral portion of a combustion chamber to be faced to the combustion chamber for injecting a fuel directly into the combustion chamber, an ignition plug arranged to be projected to the combustion chamber for igniting the fuel introduced in to the combustion chamber, an intake passage connected to the combustion chamber for introducing an intake air to the combustion chamber, intake air flow control means arranged in the intake passage for controlling an intake air flow of an inclined vortex including a tumble component and swirl component produced in the combustion chamber, engine load detecting means for detecting an engine load, engine speed detecting means for detecting an engine speed, fuel supply control means for injecting the fuel based on the engine load and engine speed from the injector to the cavity in a compression stroke to accomplish a stratified combustion condition in which a air fuel mixture with an air fuel ratio greater than a theoretical one is concentrated around the ignition plug in a first operating condition, and for injecting the fuel from the injector to the cavity in an intake stroke to accomplish a uniform combustion condition, in which an air fuel mixture with an air fuel ratio greater than a theoretical one is uniformly and entirely dispersed in the combustion chamber in a second operating condition. The first operating condition is at least in a low engine load and low engine speed condition. The second operating condition is at least in a condition beyond said low engine load and engine speed condition with regard to the engine load and engine speed. The intake air flow control means produces the inclined vortex of the air fuel mixture in the operating condition from the stratified combustion condition to the uniform combustion condition with the air fuel ratio providing a lean air fuel mixture and controls the intake gas flow so that a tumble ratio is greater than a swirl ratio in at least the uniform combustion condition of the uniform combustion condition providing a lean air fuel mixture.

In this case, the intake gas flow control means preferably produce the inclined vortex downward of a fuel injecting direction of the injector in the combustion chamber.

The intake gas flow control means preferably produces the inclined vortex with an angle greater than 45° to a plane perpendicular to a center line of a cylinder bore in the uniform combustion condition with air fuel ratio providing a lean air fuel mixture.

In a preferred embodiment, the combustion chamber is formed with a ceiling of a pent roof type combustion chamber, wherein the top surface of the piston is of a complementary configuration to that of the ceiling of the combustion chamber, wherein the cavity is formed at a position offset from a center of the top surface toward the injector, wherein the ignition plug is arranged corresponding to a peripheral edge of the cavity and wherein a vertical wall for guiding the fuel injected from the injector in a swirl direction is formed on an upstream portion of a peripheral surface of the cavity defined by a raised portion of the top surface of the piston.

A bottom of the cavity may be of a flat surface in a direction substantially perpendicular to the center line of the cylinder bore.

In another embodiment, a bottom of the cavity is inclined with regard to a plane perpendicular to the center line of the cylinder bore upward from a peripheral portion to a center of the top surface of the piston in a direction substantially perpendicular to the center line of the cylinder bore.

Preferably, the intake air flow control means includes a control valve arranged in one of the intake ports for open and close the intake port, wherein a tumble is produced even when the control valve is fully opened and a swirl is enhanced as the control valve is closed, and wherein the intake port is configured to cause a tumble ratio greater than a swirl ratio from an entire closed condition to a full open condition.

The intake gas flow control means controls the intake gas flow so as to intensify a swirl component as the engine load is increased in the stratified combustion condition.

In the preferred embodiment, the opening of the control valve is reduced as the engine load is increased in the stratified combustion condition, and the control valve is entirely closed in the uniform combustion condition with an air fuel ratio providing a lean air fuel mixture.

The swirl ratio may be obtained through a predetermined formula based on an angular speed of the intake gas in a traverse direction at a distance from a joint surface of a cylinder block and a cylinder head by 1.75 times of a diameter of a cylinder bore.

The tumble ratio may be obtained through said predetermined formula based on an angular speed of the intake gas flow in a tube.

The tube with a substantially same diameter as that of the cylinder bore is arranged along the joint surface so that a center line of the tube is located at a distance of the diameter of the cylinder plus 20 mm from the joint surface. The tumble is produced by an intake gas supply to the tube through the cylinder head when the intake gas hits against a wall of the tube. An intensity of the tumble is measured at opposite sides at distances of approximately 3.5 times of the diameter of the cylinder bore from the center of the cylinder bore.

Typically, the intake passage is an intake port. Preferably, the combustion chamber is defined by a wall surface of a cylinder bore, the top surface of the piston, and a bottom surface of the cylinder head.

In another feature of the invention, a direct injection ignition engine comprises a piston with a cavity on a top surface thereof, an injector arranged at a peripheral portion of a combustion chamber to be faced to the combustion chamber for injecting a fuel directly into the combustion chamber, an ignition plug arranged to be projected to the combustion chamber for igniting the fuel introduced into the combustion chamber, an intake passage connected to the combustion chamber for introducing an intake air to the combustion chamber, intake air flow control means arranged in the intake passage for controlling an intake air flow of an inclined vortex including a tumble component and swirl component produced in the combustion chamber, engine load detecting means for detecting an engine load, engine speed detecting means for detecting an engine speed, fuel supply control means for injecting the fuel from the injector to the cavity in a compression stroke to accomplish a stratified combustion condition in which an air fuel mixture with an air fuel ratio greater than a theoretical one is concentrated around the ignition plug in a first operating condition, and for injecting the fuel from the injector to the cavity in an intake stroke to accomplish a uniform combustion condition in which an air fuel mixture with an air fuel ratio greater than a theoretical one is uniformly and entirely dispersed in the combustion chamber in a second operating condition, and, said intake air flow control means producing the inclined vortex of the air fuel mixture in the operating condition from the stratified combustion condition to the uniform combustion condition with the air fuel ratio providing a lean air fuel mixture, and controlling the intake gas flow so that the inclined vortex is directed downward of a fuel injecting direction of the injector in the combustion chamber.

In further aspect of the invention, a direct injection ignition engine comprises a piston with a cavity on a top surface thereof, an injector arranged at a peripheral portion of a combustion chamber to be faced to the combustion chamber for injecting a fuel directly into the combustion chamber, an ignition plug arranged to be projected to the combustion chamber for igniting the fuel introduced into the combustion chamber, an intake passage connected to the combustion chamber for introducing an intake air to the combustion chamber, intake air flow control valve arranged in the intake passage for controlling an intake air flow of an inclined vortex including a tumble component and swirl component produced in the combustion chamber, an actuator for driving the control valve, engine load detecting sensor for detecting an engine load, engine speed detecting sensor for detecting an engine speed, fuel supply controller, based on the output signals from the engine load detecting sensor and the engine speed detecting sensor, for producing control signals for the injector which include a fuel injection amount and fuel injection timing in a compression stroke for accomplishing a stratified combustion condition in which an air fuel mixture with an air fuel ratio greater than a theoretical one is concentrated around the ignition plug in a first operating condition, and, the fuel injection amount and fuel injection timing in an intake stroke for accomplishing a uniform combustion condition in which an air fuel mixture with an air fuel ratio greater than a theoretical one is uniformly and entirely dispersed in the combustion chamber in a second operating condition, and, producing control signals for the actuator to produce the inclined vortex of the air fuel mixture in the operating condition from the stratified combustion condition to the uniform combustion condition with the air fuel ratio providing a lean air fuel mixture and to provide a control amount of the control valve so that a tumble ratio is greater than a swirl ratio in at least the uniform combustion condition of the uniform combustion condition providing a lean air fuel mixture According to another embodiment of the invention, a direct injection ignition engine comprises, a piston with a cavity on a top surface thereof, an injector arranged at a peripheral portion of a combustion chamber to be faced to the combustion chamber for injecting a fuel directly into the combustion chamber, an ignition plug arranged to be projected to the combustion chamber for igniting the fuel introduced into the combustion chamber, an intake passage connected to the combustion chamber for introducing an intake air to the combustion chamber, intake air flow control valve arranged in the intake passage for controlling an intake air flow of an inclined vortex including a tumble component and swirl component produced in the combustion chamber, an actuator for driving the control valve, engine load detecting sensor for detecting an engine load, engine speed detecting sensor for detecting an engine speed, fuel supply controller, based on the output signals from the engine load detecting sensor and the engine speed detecting sensor, for producing control signals for the injector which include a fuel injection amount and fuel injection timing in a compression stroke for accomplishing a stratified combustion condition in which an air fuel mixture with an air fuel ratio greater than a theoretical one is concentrated around the ignition plug in a first operating condition, and, the fuel injection amount and fuel injection timing in an intake stroke for accomplishing a uniform combustion condition in which an air fuel mixture with an air fuel ratio greater than a theoretical one is uniformly and entirely dispersed in the combustion chamber in a second condition, and, producing control signals for the actuator to produce the inclined vortex of the air fuel mixture in the operating condition from the stratified combustion condition to the uniform combustion condition with the air fuel ratio providing a lean air fuel mixture and to provide a control amount of the control valve so that the inclined vortex is directed downward of a fuel injecting direction of the injector in the combustion chamber in at least the uniform combustion condition with the air fuel ratio for providing the lean air fuel mixture.

Further objects, features and advantages of the present invention will become apparent from the Detailed Description of Preferred Embodiments which follows when read in light of the accompanying Figures.

DETAILED DESCRIPTION OF THE PREFERRED EMBODIMENTS

Figure 1:
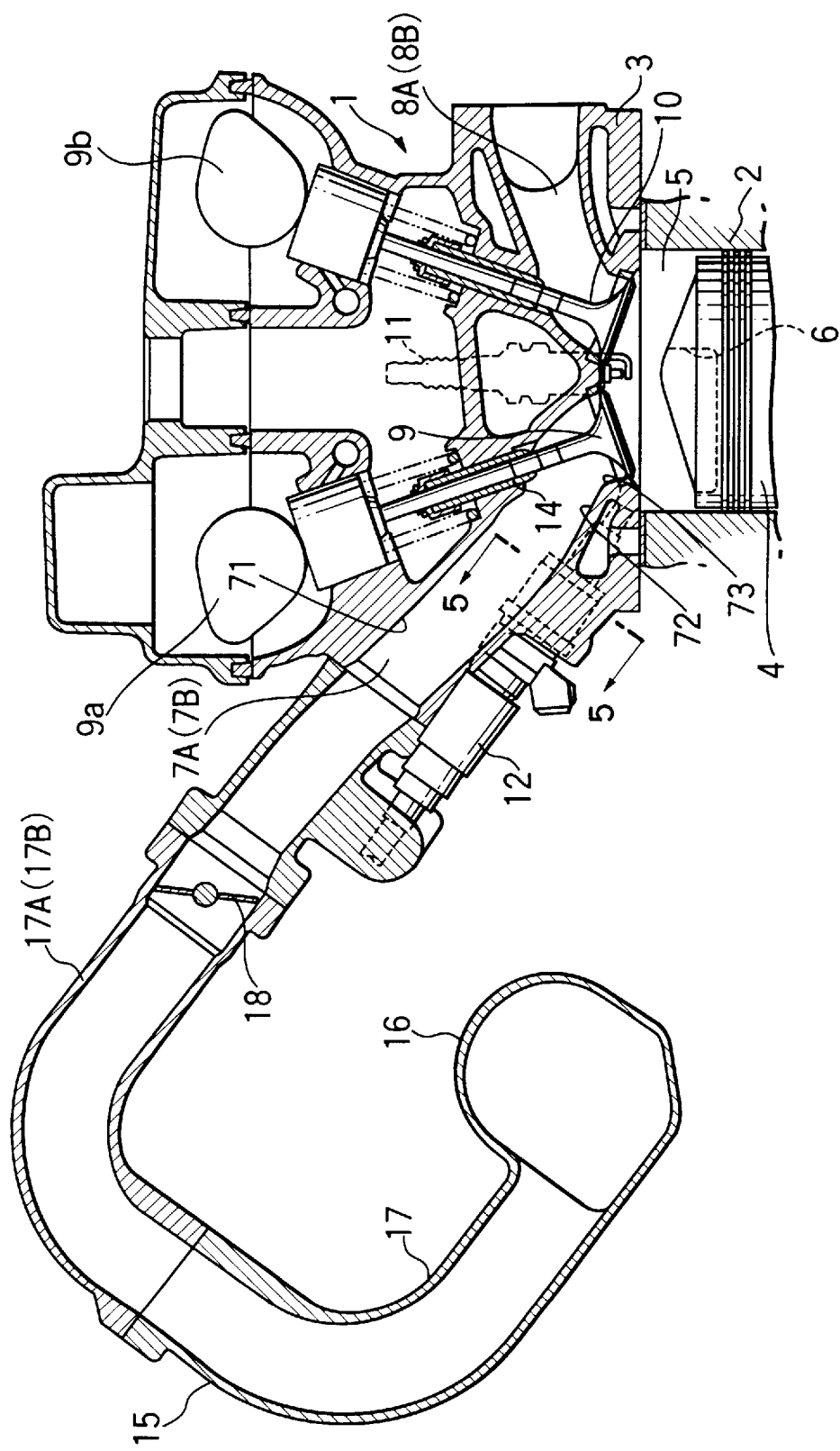
FIG. 1 is a sectional view of a direct injection ignition engine body according to the present invention.
Figure 2:
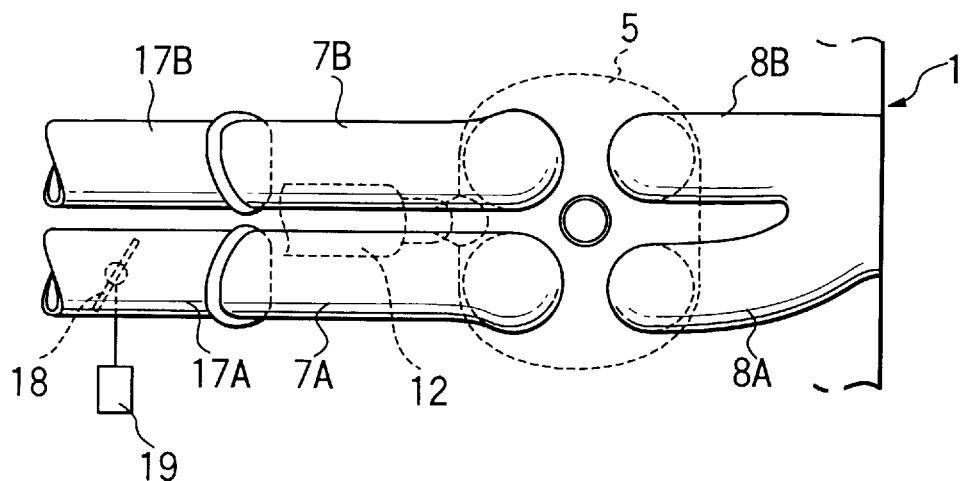
FIG. 2 is a schematic plan view of a combustion chamber and intake system.

Hereinafter, the present invention is described in detail taking reference with the attached drawings. FIGS. 1 and 2 show a structure of a combustion chamber of a direct injection ignition engine, which is a gasoline engine and thus, distinguished from a diesel engine. The engine illustrated in FIG. 1 is provided with an engine body 1 constituted by a cylinder block 2, cylinder head 3 and the like. The engine body is formed with a plurality of cylinders in which pistons 4 are disposed respectively. Between a top surface of the cylinder and a lower surface of the cylinder head 3 is formed a combustion chamber 5. A cavity 6 is formed on the top surface of the piston. A pair of intake ports 7A, 7B and a pair of exhaust ports 8A, 8B are formed on the cylinder head 3. A pair of intake valves 9 and exhaust valves 10 for opening and closing the ports 7A, 7B and 8A, 8B, cam shaft 9a, 9b extending in the longitudinal direction of the engine for driving the intake valves 9 and exhaust valves 10 and an ignition plug 11 and injector 12 are provided in the cylinder head 3. In addition, an injector 12 is disposed so as to inject a fuel directly into the combustion chamber 5. The ignition plug 11 is disposed in the middle of the combustion chamber 5.

Figure 3:
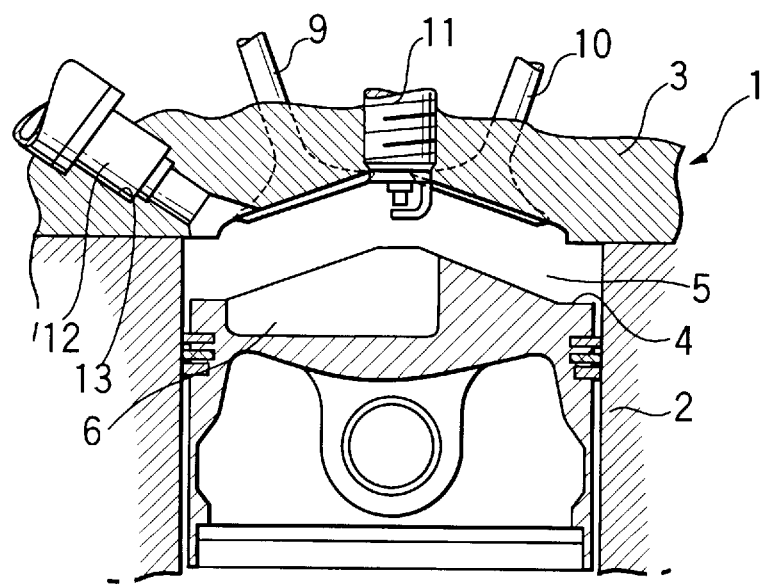
FIG. 3 is a sectional view of the combustion chamber of the engine of the present invention.
Figure 4:
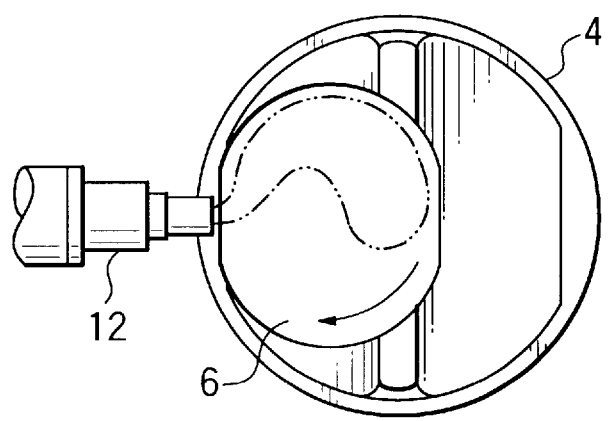
FIG. 4 is a plan view of the top surface of the piston.
Figure 5:
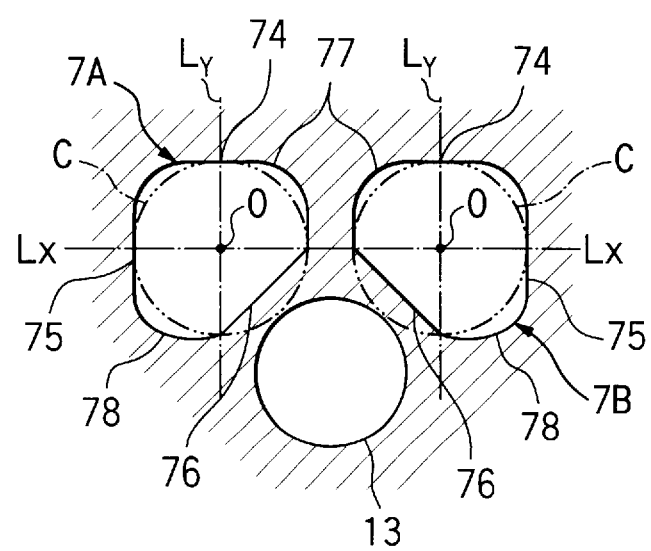
FIG. 5 is a sectional view of the intake port take along a line 5—5.

The lower surface of the cylinder head 3 or ceiling of the combustion chamber 5 is of a pent roof type combustion chamber. The top surface of the piston is projected in a central portion to form a pent roof type combustion chamber corresponding to the cylinder head 3. The top surface of the piston 4 is partially recessed to form the cavity 6 as shown in FIGS. 3 and 4. The cavity 6 is located close to the injector 12. The cavity 6 is formed in an area which extends from the peripheral portion close to the injector 12 to the central portion of the top surface. The ignition plug 11 is directed to the cavity 6 in the central portion of the top surface. In this embodiment, the cavity 6 is of a rectangular configuration as a plan view as shown in FIG. 4. As shown by sectional view as shown in FIG. 3, the bottom surface of the cavity 6 extends horizontally (a direction perpendicular to the axis of the cylinder bore ) and the peripheral wall of the cavity 6 extends vertically ( the same direction as the axis of the cylinder bore).

The intake ports 7A, 7B as shown by a sectional view in FIG. 1 independently formed to include an upper stream end straight portion 71 downwardly extending, a middle portion 72 continuous from the portion 71 with a reduced inclination and a downstream end portion 73 continuous from the portion 72. The portion 73 includes a throat portion continued to the opening. The inclination of the downstream portion 73 is gradually increased to be opened in the combustion chamber 5. The cross sectioned configurations of the intake ports 7A, 7B are symmetrical with each other. The straight portion 71 is of an asymmetrical configuration, or substantially triangle configuration having an upper side portion 74 away from the bottom surface of the cylinder head, an outer side portion 75 opposite to the other port and an oblique side portion 76 extending downwardly outwardly in an inner side between the ports 7A, 7B. A short inner side portion 77 is formed between the upper portion 74 and the oblique side portion 76 and a short lower oblique side portion 78 is formed between the outer side portion 75 and the oblique side portion 76 and thus the ports 7A and 7B are of pentagonal configurations. A center O is defined as a cross point of a line of the maximum width of the ports 7A and 7B in a traverse direction and a line of the maximum length thereof in vertical direction. Center lines Lx and Ly are defined to be extended in the traverse and vertical directions respectively and passing the center O. A reference circle C (equivalent to the cross sectioned configuration when the ports are cylindrical) is defined to have the center O and diameter of the maximum width. Compared with the reference circle C, the actual ports increase the cross section in the upper portion of the traverse center line Ly and in the outer side of the vertical center line Lx. This means that although the upper side portion 74 and outer side portion 75 are substantially aligned with the reference circle C, both sides of the cross point of the center line Ly and the upper side portion 74 and both sides of the cross point of the center line Lx and the outer side portion 75 are expanded in a radial direction of the reference circle C. With this structure, an amount of air flow is increased in the upper portion and outer side portions of the intake ports 7A, 7B so as to intensify the tumble and swirl. The oblique side 76 is concaved from the reference circle C toward the center O.

Figure 6:
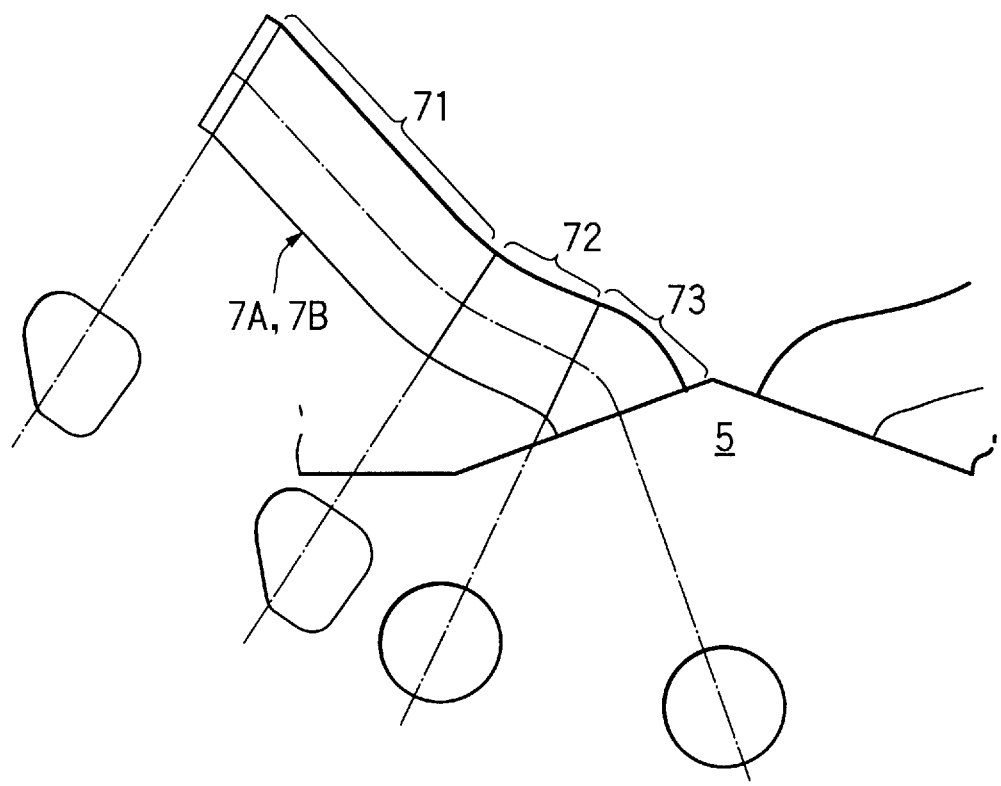
FIG. 6 is a view showing sectional port configurations different positions along a stream line of the intake gas.
Figure 7:
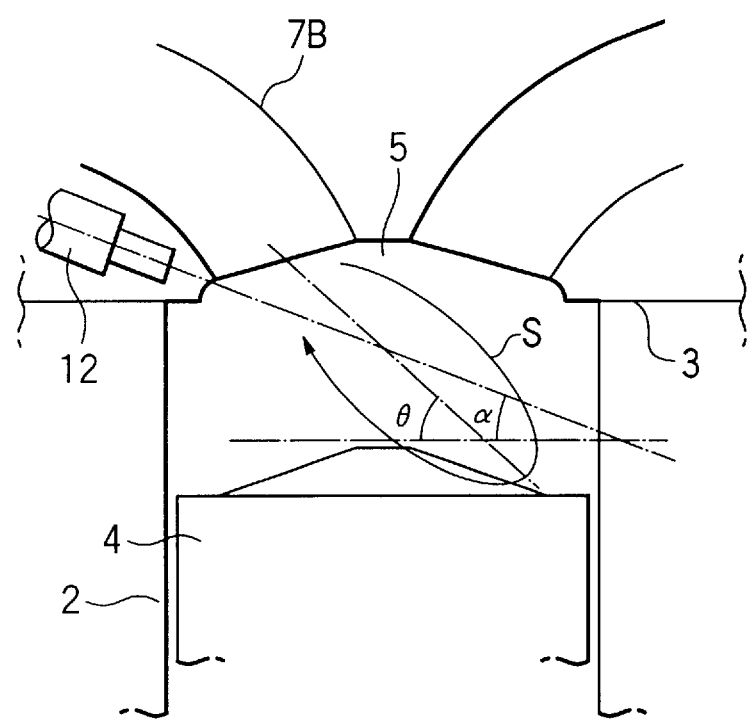
FIG. 7 is a view showing an inclined vortex.

As shown in FIG. 6, the port is of a substantially constant triangle configuration in section in the straight portion 71. In the down stream portion 73, the port is of a cylindrical configuration in section. Thus, the port is gradually changed in the portion 72 from the substantial triangle configuration in section in the portion 71 to the circular configuration in section in the portion 73.

The injector 12 is mounted on the injector mounting hole 13 provided beneath the intake ports 7A and 7B so as to inject the fuel from the peripheral portion of the combustion chamber 5 obliquely downwardly in the combustion chamber 5.

A valve guide 14 for supporting the valve shaft of the intake valve 9 slidably is mounted on the cylinder head 3 at an upper wall of the reduced inclination portion 72 of the ports 7A and 7B. The both intake ports 7A and 7B are disposed not to interfere with the injector 12, intake valve 9, valve guide 13. In particular, the ports 7A and 7B are of configurations smaller than the reference circle C. Thus, a space enough to dispose the injector 12 is obtained underneath both of the intake ports 7A and 7B.

An intake manifold 15 is joined with one side of the engine body 1. The intake manifold 15 includes divisional tubular portion 17 downstream of a surge tank 16. A pair of intake passages 17A, 17B communicating with the intake ports 7A and 7B are formed in the tubular portion 17. In order to control the intake gas flow in the ports 7A, 7B, a control valve 18 is provided in the passage 17A so that the air flow to the passage 7A is opened and closed in accordance with the operation of the valve 18. The valve 18 is driven by an actuator 19 such as step motor.

An inclined vortex having a swirl component and tumble component can be produced by virtue bo the intake ports 7A and 7B and the control valve 18 and the respective components can be controlled.

When the valve 18 is entirely closed or partially opened so as to limit the intake flow through the intake port 7A, and thus increase the intake gas flow in the intake port 7B, an intensified swirl (horizontal component) is produced in the combustion chamber 5. The straight portion 71 and the downstream portion 73 have a relatively large inclination and the reduced inclined portion 72 is relatively short so that the intake vortex flow includes the tumble component (vertical component). Accordingly, when the control valve 18 is entirely closed or partially opened, both swirl and tumble components are obtained, namely, the inclined vortex S is generated in the combustion chamber 5.

The vortex is maximized when the control valve 18 is entirely closed. Preferably, the intake port is designed so that a tumble ratio is greater than a swirl ratio, in other words, the vortex of the inclination angle θ (an angle to the horizontal plane perpendicular to the center axis of the cylinder bore) greater than 45 degree can be produced. The inclination angle θ is an angle of a horizontal component of an angular momentum $\Omega y$ of the inclined vortex to a vertical component of an angular momentum $\Omega x$ thereof and the angle θ can be denoted as:

$$\theta = \text{Tan}^{-1}(\Omega y / \Omega x)$$

As the valve 18 is gradually opened from the entirely closed position, the swirl component is weakened due to the collision of intake stream from the intake ports 7A and 7B. When the valve 18 is fully opened, the swirl component becomes substantially zero. However, the tumble component still remains.

Figure 8:
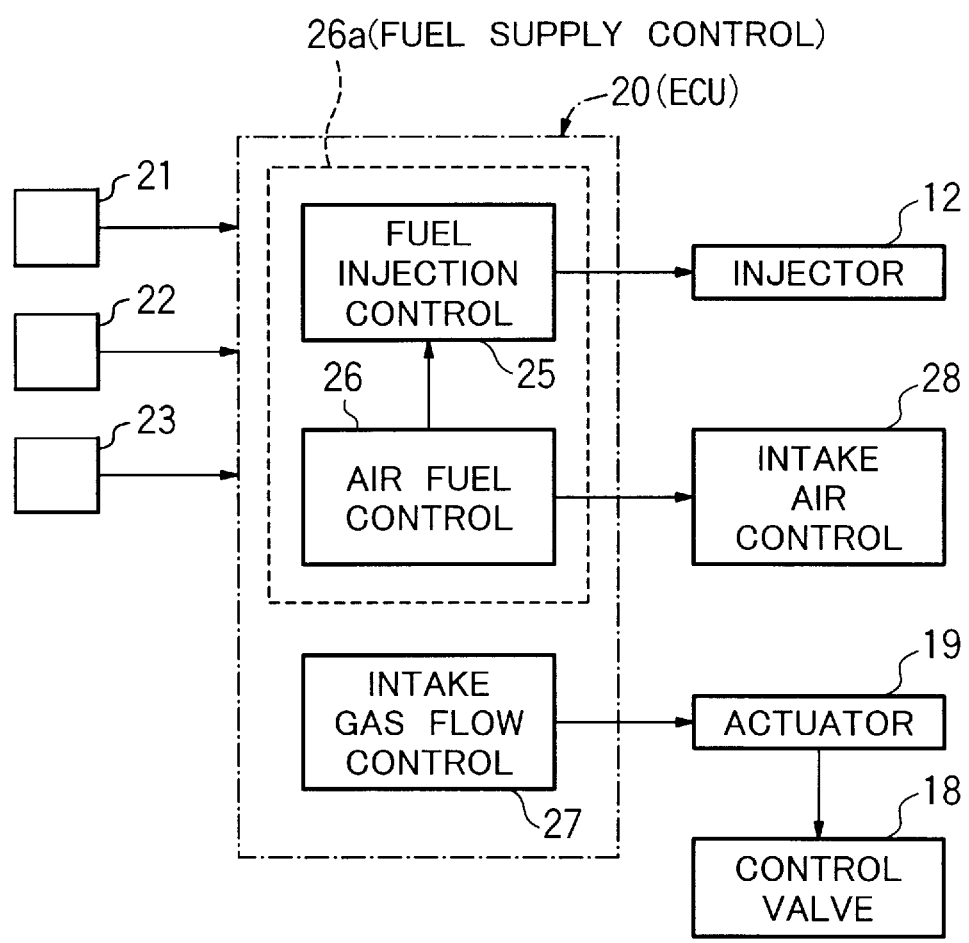
FIG. 8 is a block diagram showing a control system.

FIG. 8 shows an engine control system. Electronic Control Unit (ECU) 20 including a microcomputer detects a crank angle signal produced in accordance with a rotation of a crank shaft at a predetermined interval and receives signals from an engine speed sensor for detecting an engine speed based on the crank angle signal acceleration sensor 22 for detecting acceleration opening or accelerator stroke, air-flow meter 23 for detecting an intake air amount and the like.

The ECU 20 includes a fuel supply controller 26a including a fuel injection controller 25 and air fuel ratio controller 26, intake gas flow controller 27. The fuel injection controller 25 changes the fuel injection pattern from the injector 12 between an compression stroke injection in which the fuel is injected for a predetermined period in the later stage of compression stroke to establish the stratified combustion and the intake stroke injection in which the fuel is injected for a predetermined period in the intake stroke to establish the uniform combustion in accordance with the operating condition.

The air fuel ratio controller 26 controls the fuel injection amount through the fuel injection controller 25 to control the air fuel ratio in accordance with the operating condition and controls an intake air amount controller 28 such as an electrical throttle valve in which a throttle valve is controlled electrically by an electrical actuator and the like.

Figure 9:
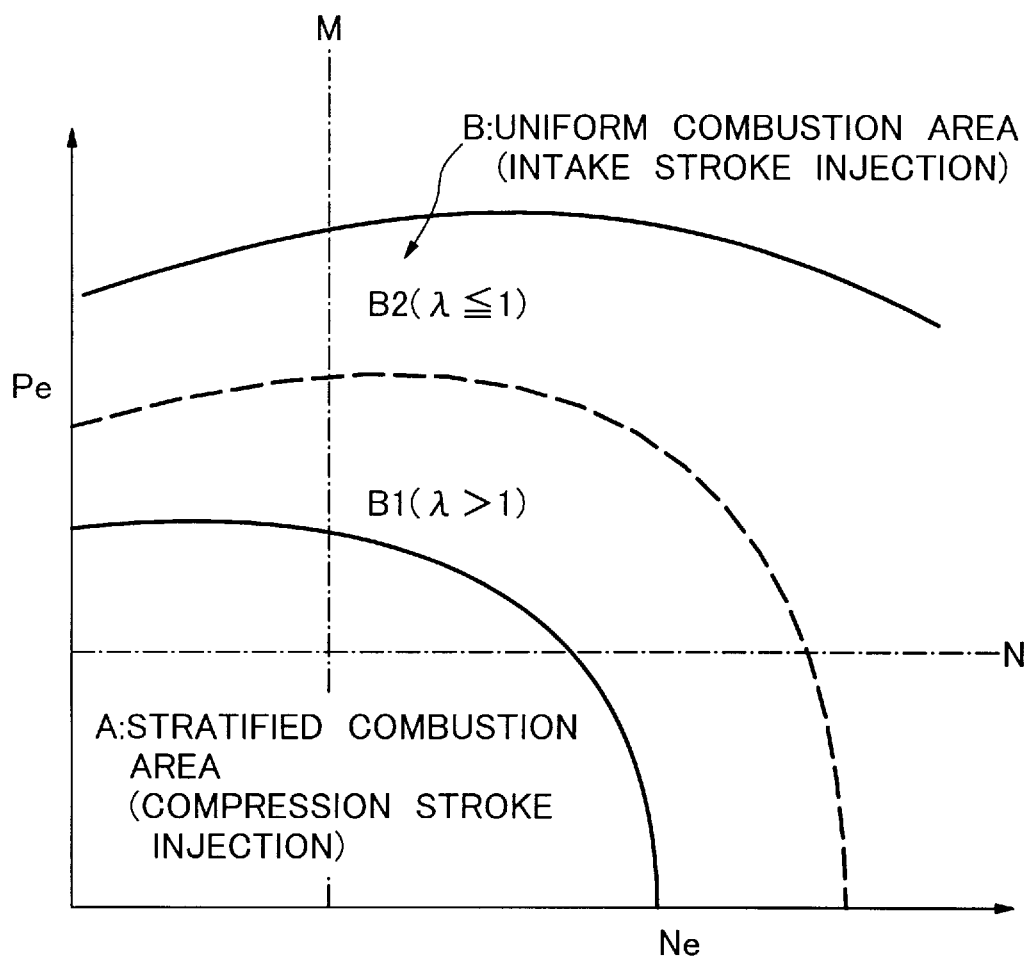
FIG. 9 is a control map of the fuel injection pattern and air fuel ratio.

The intake gas flow controller 27 controls the control valve 18 through an actuator 19 to change the intake gas flow condition in accordance with the operating condition. FIG. 9 shows a control map showing the fuel injection pattern and the air fuel raio wherein the engine load (such as mean effective pressure Pe obtained based on the intake gas amount) is taken on the ordinates and the engine speed is taken on the abscissas. A stratified combustion area A is defined as an area when the engine load is lower than a predetermined value and the engine speed is lower than a predetermined value. The compression stroke injection is executed in the area A and the air fuel ratio is controlled to take a large value such as A/F=40 to be a lean air fuel air fuel mixture. A uniform combustion area B is defined as an area when the engine load is greater than the predetermined value and the engine speed is greater than the predetermined value. The intake stroke injection is executed within the area B. In the area B, an area B1 is defined where the engine speed and engine load are relatively low and close to the area A. The air fuel ratio is larger than the theoretical value ($\lambda$=1) and takes a value such as A/F=20. On the other hand, the air fuel raio A/F takes a smaller one ($\lambda \leq 1$), such as a value A/F= 13–14.7 or makes the mixture richer in an area B2 where the engine load and engine speed are relatively high in the area B.

As the intake air flow control, the inclined vortex is generated in the stratified combustion area A and uniform combustion area B. A tumble ratio is greater than a swirl ratio in the area B1. In this case, the inclined vortex oriented lower than that of the fuel injecting direction by the injector 12 is generated. In particular, the injector 12 takes a mount angle a$\alpha$=35±10° to the horizontal plane due to a limitation on the layout condition, such as interference with the intake ports 7A, 7B. The fuel injected from the injector 12 forms a conical configuration around an injection line. The inclination angle $\theta$ of the swirl S is greater than the mount angle $\alpha$ of the injector 12 in the uniform combustion area B1 in which the air fuel ratio is controlled to provide a lean air fuel mixture.

The intake ports 7A and 7B of the present embodiment is so configured that the tumble ratio is greater than the swirl ratio when the control valve 18 is entirely closed so that the inclination angle $\theta$ is greater than 45°. With this structure, the intake gas flow is controlled in accordance with the operating condition.

Figure 10:
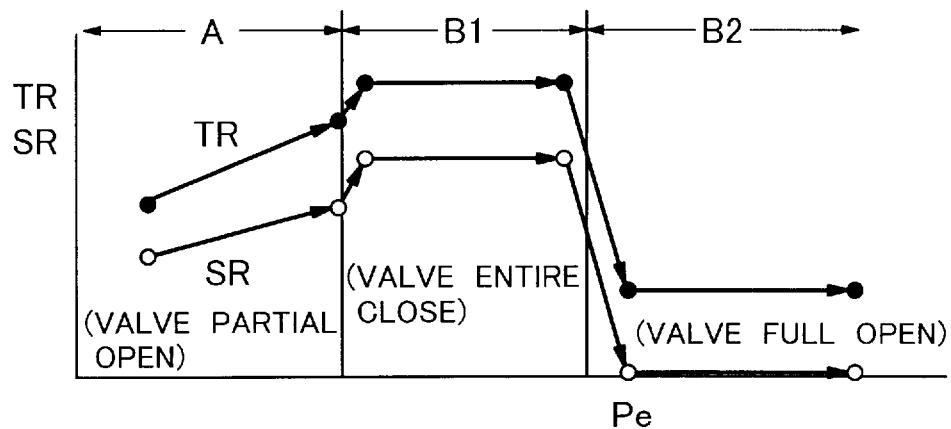
FIG. 10 is a view showing a control of the intake gas flow in accordance with the engine load.

FIG. 10 shows an intake gas flow control in accordance with an engine load in the respective operating area when the engine speed is low(=M). In the stratified combustion area A, the control valve 18 is partially opened, and increased in the lower engine load. As the engine load is increased, the opening of the valve 18 is reduced to disperse the air fuel mixture properly so that the swirl ratio SRi and tumble Tri aren increased. In the area B1 of the uniform combustion area B in which the air fuel ratio is controlled to provide a lean air fuel mixture, the control valve 18 is entirely closed so that the swirl ratio SR and tumble ratio TR are maximized. In the area B2 of the area B in which the air fuel ratio is controlled to provide a rich air fuel mixture, the control vavle 18 is fully opened so that the swirl ratio SR becomes zero.

Figure 11:
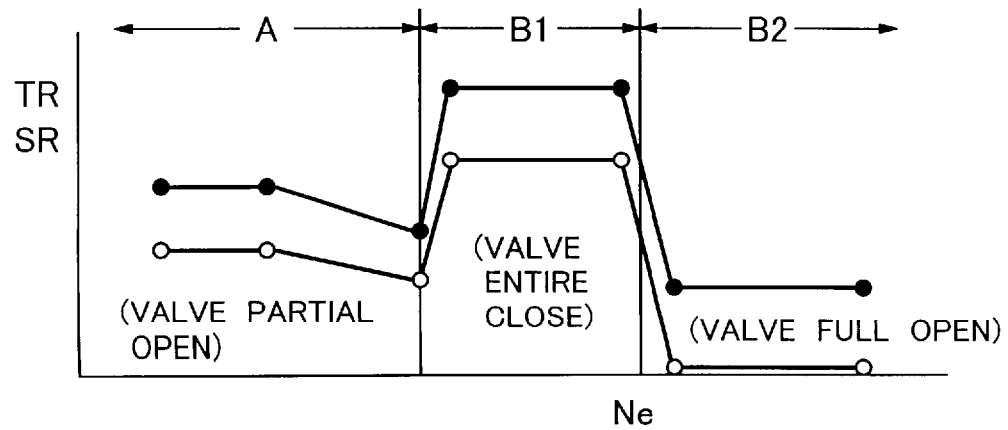
FIG. 11 is a view showing a control of the intake gas flow in accordance with the engine speed.

FIG. 11 shows an intake gas flow control property in accordance with the engine speed in the respective operating areas when the engine load is low(=N). The control valve 18 is partially opened in the stratified combustion area A. As the engine speed is increased, the opening of the control valve 18 is increased to reduce the swirl ratio SR and tumble ratio TR. Similarly to the control of FIG. 10 in accordance with the engine load, the valve 18 is entirely closed in the area B1 and fully opened in the area B2.

Hereinafter, definitions of the swirl ratio and the tumble ratio and a method for measuring thereof will be explained.

Figure 12:
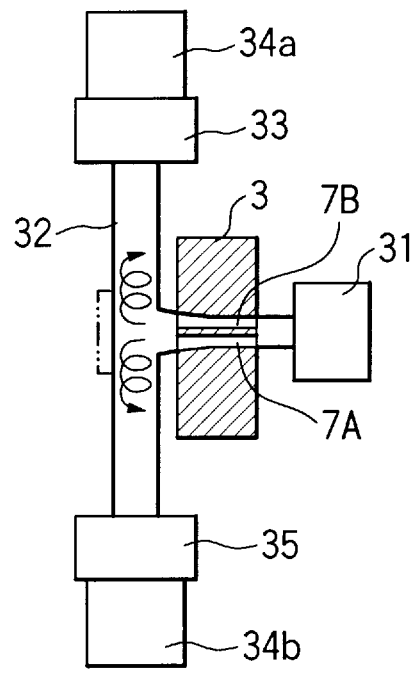
FIG. 12 is a schematic view of a device for measuring the tumble ratio.

An angular speed of the intake gas in the vertical direction is measured and integrated and the integrated value is divided by an angular speed of the crank angle of the engine. The resultant value is defined as the tumble ratio TR. The angular speed of the intake gas in the vertical direction is measured by a measuring device as shown in FIG. 12. In FIG. 12, the cylinder head 3 is disposed in a manner that the intake ports 7A and 7B are oriented in the horizontal direction. An air supply device 31 is connected to the upstream end of the intake port 7. A tumble measurement tuble 32 corresponding to the cylinder bore is connected to the cylinder head 3 at the combustion chamber side through a short joint portion in a direction of the cam shaft along which a tumble flow of the intake gas hits on a hypethetical wall surface in parallel with a lower surface of the cylinder head and facing to the opening of the intake ports to form an aireddy. An impulse meter or torque sensor 34a (commercially available from Tsukasa Sokken inc. as Impulse Swirl Meter Model ISM-2 having a hunney comb shaped rotor 33 is connected with one end of the tube 32. Similarly, another impluse meter 34b with a hunnycomb shaped rotor 35 is connected with the other end of the tuble 35.

With this device, the tumble is produced by the intake gas supply in the tube 32. A torque caused by the tumble and acting on the hunnycomb rotor 33 is measured by the impulse meter 34 to obtain the angular speed of the intake gas in a direction of the cross section of the tube 32. Then, the angular speed of the intake gas in the vertical direction is calculated based thereon. In this case, the diameter D of the tube 32 is the same size as the cylinder bore and the length of the tube 32 is large enough compared to the diameter of thereof to obtain the accuracy and the stability of the measurement. For example, the length of the tube 32 may be seven times the diameter D. Further, the lengths from the intake ports to the respective honeycomb rotors 33 and 35 in the opposite ends are preferably the same. The distance from the intake ports to the center of the tube 32 is set at (D/2+20) mm wherein the diameter D is 50–100 mm.

The tumble ratio can be obtained through the following formula (I). G value is introduced to the formula (I) as a sum of the output of the both impulse meters 34a and 34b.

$$SR = \eta v [DS \! \int (cfN\!fd\alpha)]/[nd^2 \! \int (cf-d\alpha)^2] \tag{I}$$

$$Nr = 8G/(MDV_0) \tag{II}$$

Wherein
 SR=swirl ratio
 $\eta v$=volumetric efficiency
 D=cylinder bore diameter
 S=stroke
 n=the number of intake valves
 d=throat diameter
 cf=flow rate coefficients at respective valve lifts as the valve moves
 Nr=non-demensional rig swirl value at respective valve lift as the valve moves
 $\alpha$=crank angle
 G=impulse swirl meter torque
 $V_0$=velocity head
 The fomula (II) can be obtained as follows;

$$G = I\omega r \tag{1}$$

$$I = MD^2/8 \tag{2}$$

Introducing the value I of fomula (2) to the fomula (1), $$G = MD^2\omega r/8 \tag{3}$$

Thus, $$D\omega r = 8G/(MD) \tag{4}$$

$$Nr = D\omega r/V_0 \tag{5}$$

Introducing the fomula (4) to fomula (5), $$Nr = 8G/(MD\ V_0)$$

Wherein

ωr=Rig swirl value,
I= Inertia moment of the air in the cylinder at the bottom dead center,
$V_0 = (2\Delta p/p)^{1/2}$, Δp=Total Pressure Drop over Port (=800 mmAg)
ρ=Air Density
(With regard to the fomulas (I) and (II), see "Honda R&D Technical Review Vol.1, 1989)

Figure 13:
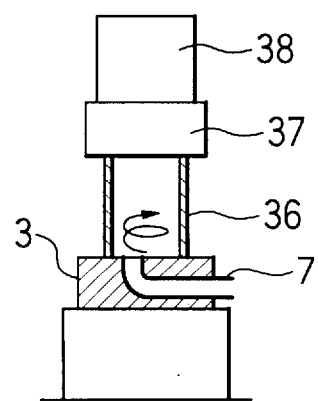
FIG. 13 is a schematic view of a device for measuring the swirl ratio.

An angular speed of the intake gas in the horizontal direction is measured and integrated and the integrated value is divided by an angular speed of the crank angle of the engine. The resultant value is defined as the swirl ratio SRi. The angular speed of the intake gas in the horizontal direction is measured by a measuring device as shown in FIG. 13. In FIG. 13, the cylinder head 3 is arranged on a base in the up side down. The intake port is connected to the intake gas supply device (not shown). A cylinder 36 is arranged on the cylinder head 3. An impulse meter 38 with a honeycomb shaped rotor 37 is connected to the cylinder 36. A lower surface of the impulse meter 34 is positioned at a distance of 1.75 D from a joint surface between the cylinder head 3 and cylinder block wherein D is a diameter of the cylinder bore. In this case, the swirl ratio is obtained by providing the value G with the output of the impulse meter 38 in the formula (I).

The torque acting on the honeycomb shaped rotor 37 due to the swirl in the cylinder 36 produced in accordance with the intake air supply is measured by means of the impulse meter 38. The angular speed of the intake gas flow in the traverse direction is obtained based on the torque measured.

Next, the engine operation in this preferred embodiment will be explained.

In the stratified combustion area in the low engine load and low engine speed condition, the fuel is injected from the injector 12, which is arranged in a peripheral portion of the combustion chamber 5 at the compression stroke. The air fuel mixture is stratified to be concentrated around the ignition plug 11. As a result, a remarkably lean air fuel mixture with a large value of the air fuel ratio can be ignited and combusted. The high engine load and high engine speed condition constitutes the uniform combustion area B. In the uniform combustion area B, the fuel is injected in the intake stroke that the air fuel mixture is dispersed in the whole combustion chamber. In the area B1 of the relatively low engine load and/or relatively low engine speed in the area B, the air fuel ratio is controlled to provide a relatively lean air fuel mixture so that the fuel consumption efficiency can be improved in the area B1 as well.

The combustion pattern and air fuel ratio are changed in accordance with the operating condition. The intake gas flow is controlled to produce the inclined vortex from the stratified combustion area A to the uniform combustion area in response to the change of the combustion pattern and the air fuel ratio. As a result, the combustion performance can be improved in the stratified combustion condition and the uniform combustion in the lean air fuel mixture.

In particular, when the stratified combustion is executed, the inclined vortex including the tumble component is maintained until the half way of the compression stroke. Thus, the fuel injected from the injector 12 in the oblique direction is forced to be directed downwardly due to the tumble component of the inclined vortex so that the large amount of the injected fuel is trapped in the cavity 6. Accordingly, the trapping performance is enhanced. In the case where only the tumble is produced, although the tumble helps to improve the trapping performance of the atomized fuel injected, it is not enough to lead the fuel toward the ignition plug from the cavity. As a result, the air fuel ratio of the air fuel mixture tends to vary unstably around the ignition plug 11. On the contrary, according to the preferred embodiment of the present invention, after the injected fuel was trapped in the cavity 6, as the piston gets close to the top dead center in the later stage of the compression stroke, the tumble component of the inclined vortex is destroyed by the projected portion outside of the top portion of the piston 4 but the main part of swirl component still remains and flows along the peripheral surface toward the middle position of the combustion chamber 5 to be directed upwardly and eventually led to the ignition plug 11. Thus, according to the structure of the present invention, the air fuel mixture is effectively introduced around the ignition plug 11.

Figure 14:
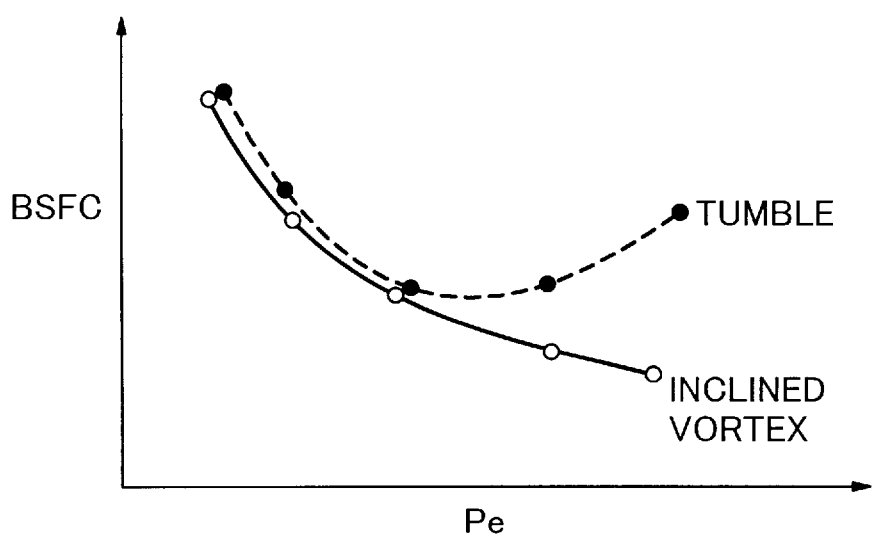
FIG. 14 is a graphical representation showing changes of the fuel consumption efficiency in accordance with the engine load in the case of tumble and the inclined vortex respectively.

In addition, as shown in FIG. 10, the control valve 18 is controlled to intensify the swirl and tumble as the engine load is increased. As a result, the air fuel mixture is properly dispersed in the middle engine load condition of the stratified combustion area A in which a relatively large amount of the fuel is injected. The air fuel ratio of the air fuel mixture is properly maintained around the ignition plug 11 to improve the combustion performance. Comparing the intake system in which only the tumble is produced with the intake system according to the present invention in which the inclined vortex is produced with regard to the fuel combustion efficiency BSFC(Brake Specific Fuel Consumption), as shown in FIG. 14, in the system in which only the tumble is produced, the tumble is decayed and collapsed at the later stage of the compression stroke. As a result, the air fuel mixture is not properly dispersed and thus the fuel consumption efficiency is deteriorated as shown by broken line in the relatively high engine load condition of the stratified combustion area nevertheless the fuel injection amount is increased. On the other hand, in the system in which the inclined vortex is produced, the air fuel mixture is properly dispersed as aforementioned. Therefore, the fuel consumption efficiency can be improved in the middle engine load condition as shown by a real line. In the uniform combustion condition when the air fuel ratio is controlled to provide a lean air fuel mixture, the control valve 18 is entirely closed so as to intensify the swirl and tumble component. In this case, the inclined vortex with a relatively large inclination angle θ in which the tumble component is stronger than the swirl component is produced so that a desirable uniform combustion condition is obtained. As aforementioned, the injector 12 is arranged with a relatively small angle to the plane perpendicular to the center axis of the cylinder bore in order to avoide the interference with the intake ports 7A and 7B. Thus, the fuel is also injected to the combustion chamber 5 with a small angle due to the arrangement of the injector 12. Accordingly, if the gas flow in the combustion chamber 5 is weak, the injected fuel would be undesirably adhered to the cylinder wall opposite to the injector 12.

However, according to the preferred embodiment, the inclined or oblique vortex is produced. In particular, the inclined vortex of the present invention is directed downward of the injecting direction of the injector 12. As a result, the injected fuel is forced to be directed downward due to the inclined vortex so that the injected fuel is prevented from adhering to the cylinder wall and is dispersed in the whole combustion chamber 5. Thus, the combustion performance is improved.

Figure 15:
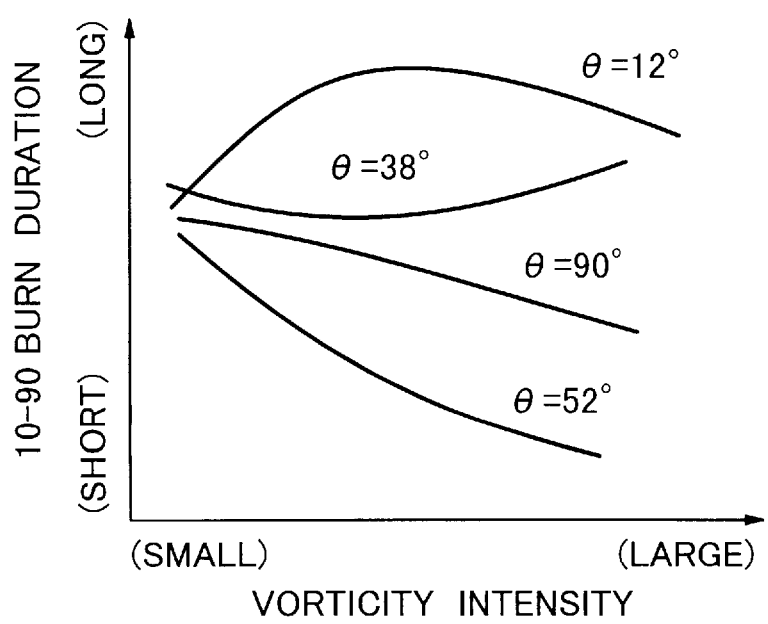
FIG. 15 is a view showing a relationship of the vorticity intensity and 10–90 burn duration when the vortex inclination angle is changed.

In FIG. 15, a relationship between the Vorticity Intensity in the uniform combustion condition and 10–90 Burn Duration is shown as the inclination angle θ is varied. When the inclination angle is small, such as θ=12° or θ=38°, the combustion gas is densified in the peripheral portion of the combustion chamber 5 to cause a reversed stratified condition in which the air fuel mixture is difficult to be uniformly dispersed. This deteriorated distribution of the air fuel mixture would prevent the swirl from facilitating a proper combustion. As a result, even though the vorticity intensity is enhanced, the combustion tim is not reduced. On the other hand, when the vortex inclination angle θ is increased, such as θ=52° in the embodiment, the reversed stratified condition is eliminated so that the combustion gas is dispersed uniformly in the whole combustion chamber 5. As a result, due to the synergetic action of the improvement of the dispersion and the intensified turbulence of the air fuel mixture, the combustion performance is remarkably improved to reduce the combustion time as the vorticity intensity.

The above mentioned improvement of the combustion performance in the uniform combustion condtion when the air fuel ratio is controlled to provide a lean air fuel mixture can be effectively obtained by increasing the tumble ratio compared with the swirl ratio so that the inclined vortex of the vortex inclination angle θ greater than 45° is produced.

In addition, in the high engine load and high engine speed condition in which the air fuel ratio is controlled to have a value $\lambda \leq 1$ and thus to provide a rich air fuel mixture when the uniform combusion is executed, the control valve 18 is fully opened to increase the open area of the intake port. As a result, the swirl is eliminated whereas the tumble component remains to facilitate the dipersion of the air fuel mixture and improve the combustion performance.

Next, the operation of the control valve and the fuel injection control is explained hereinafter.

Figure 16:
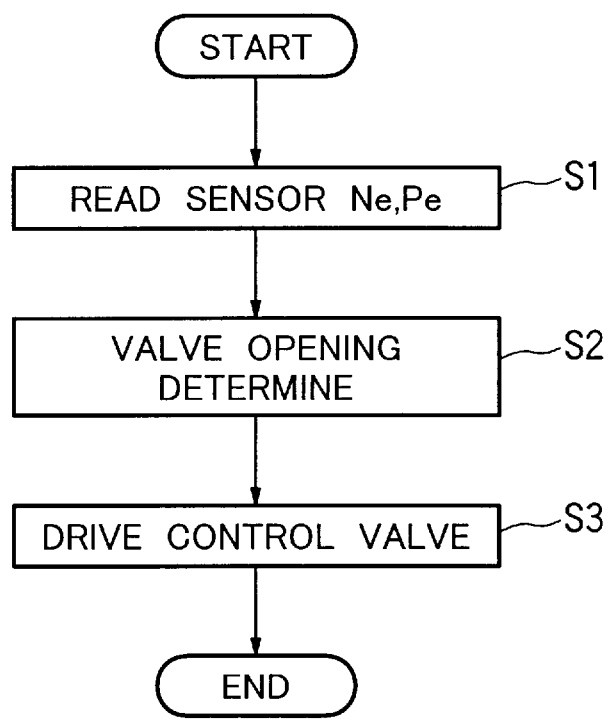
FIG. 16 is a flow chart of a control of the control valve.

FIG. 16 is a flow chart showing the operation of the control valve. This flow is executed at a predetermined interval.

The ECU reads the engine speed and the engine load in step S1. Next, the ECU determines the opening of the valve in light of a map in accordance with the engine speed and engine load so that the opening property of the valve 18 is changed as shown in FIGS. 10 and 11 in step S2. In step S3, the actuator 19 is controlled to provide the opening of the valve as determined in the step S2.

Figure 17:
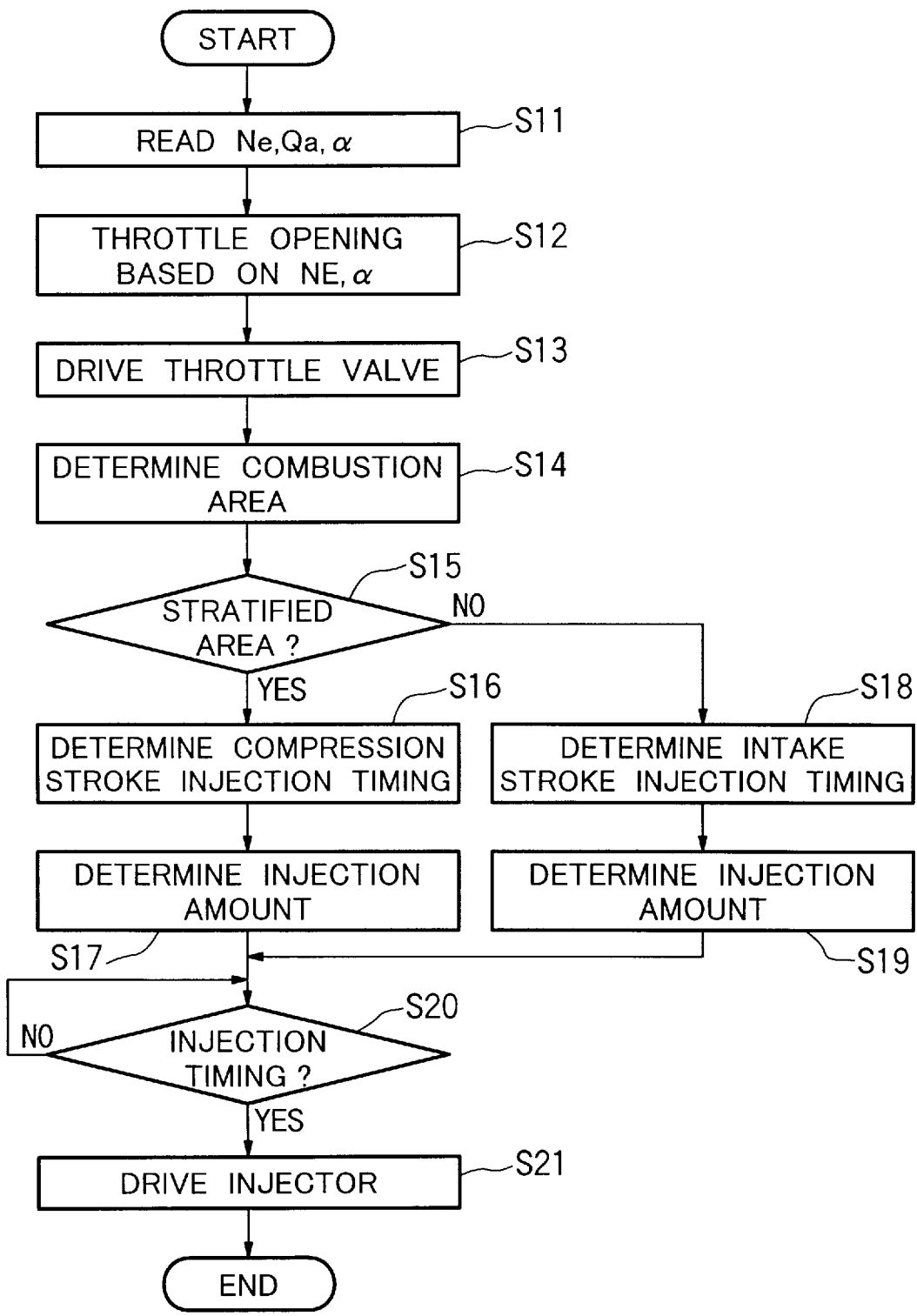
FIG. 17 is a flow chart of a fuel supply control.

FIG. 17 is a flow chart of the fuel supply control. This routine is started at a predetermined crank angle (BTDC 60° of the intake stroke) so as to execute the fuel injection.

The ECU reads the engine speed Ne, intake gas amount Qa and acceleration stroke α. In step S12, the throttle opening is determined based on the engine speed Ne and the acceleration stroke α. In step S13, the throttle valve is driven. In this case, the throttle opening is determined at a low and middle engine speed condition, and low and middle engine load condition, the throttle opening is set at relatively a large one, or about a half. In step S14, the combustion area is determined in light of the map shown in FIG. 9 based on the engine speed and the engine load. If the stratified combustion is determined in step 15, the fuel injection timing is determined at a predetermined time period in the later stage of the compression stroke in step S16. Then, the step S17 is executed. If the combustion area is not the stratified combustion area in the judgment of the step S15, the injection time period is set at a predetermined time period in the intake stroke in the step S18. Then, the step S19 is executed. In steps S17 and S19, the fuel injection amount is determined for the stratified combustion area or the uniform combustion area. In step S20,it is judged if the injection is to be made. If this judgment is yes, the fuel injector 12 is driven to inject the fuel by the predetermined time period.

The configuration of the top surface of the piston 4 having the cavity 6 can be modified variously.

Figure 18:
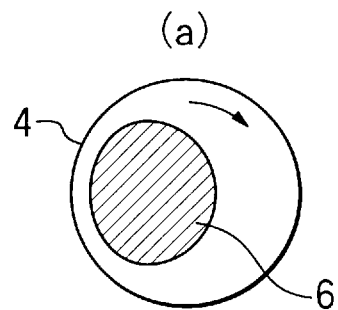
FIG. 18 is plan views of various modifications (a)–(e) of the cavity formed on the top surface of the piston.
Figure 18:
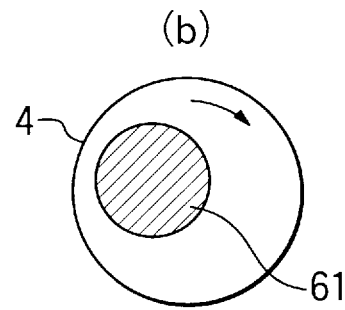
Figure 18:
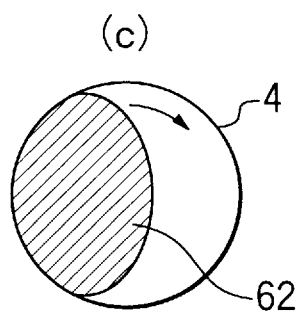
Figure 18:
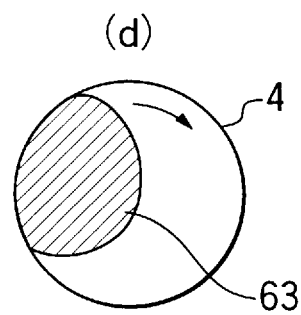
Figure 18:
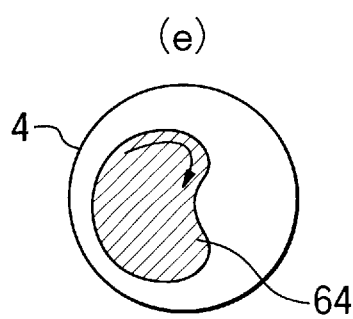
Figure 19:
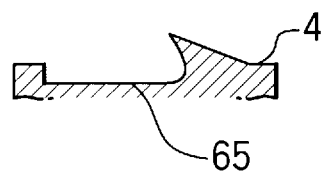
FIG. 19 is sectional views of various modifications of the cavity.
Figure 20:
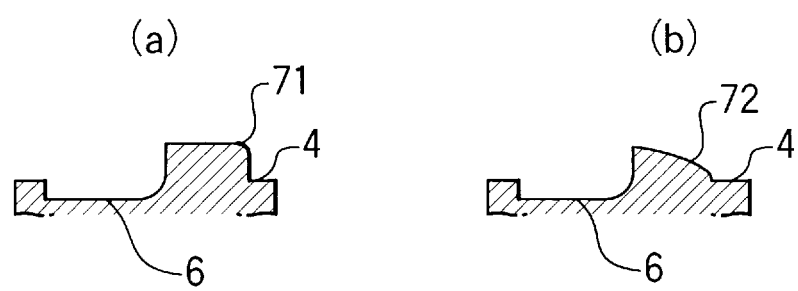
FIG. 20 is sectional views of modifications (a) and (b) of the top portion of the piston.

FIG. 18 is a plan view showing various configurations of the cavity. Figure (a) is of a basic embodiment with a cavity of an elongated circle. With this stracture, the injected fuel tends to be trapped at an upstream position in a swirl direction as shown by an arrow. In view of this, the cavity may be a configuration showing Figure (b) in which the cavity is reduced at a downstream side in the swirl direction compared with the structure of the Figure (a). Thus, a cavity 61 of the Figure (b) is offset toward the upstream side in the swirl direction. Conversely, a cavity may be expanded in the downstream side (not shown). Alternatively, a cavity 62 may be expanded toward a peripheral edge of the piston 4 as shown in Figure (c). Further, as shown in Figure (d), the cavity 62 of the Figure (c) is modified to form a cavity 63 in which a downstream side thereof is reduce in the swirl direction. A heart shape cavity 64 may be provided for increase the speed of the combustion gas flow along the peripheral surface of the cavity toward the central portion of the combustion chamber 5 by virtue of the swirl so as to lead the air fuel mixture around the ignition plug. Although the wall surface of the peripheral portion of the cavity can be of a vertical one as in the main preferred embodiment (see FIG. 3), the wall surface of the cavity can be formed with a sharp angle at a center side of the chamber 5. An external portion of the top surface of the piston 4 is of a configuration for facilitating the collapse of the tumble component, such as a pent roof type combustion chamber as in the main embodiment of the present invention. The external portion may be configured as shown in FIG. 20(a) in which the top surface of the projected portion is of a flat surface 71, or may be of a partial bulb surface 72. The structure of the projected portion as shown in FIG. 20(a) is advantageous to collapse the tumble component at the later stage of the compression stroke. However, the structure would be complicated, if such structure is to be embodied without reduction of the compression ratio. In this regard, the pent roof type structure of the main embodiment can obtain the desirable compression ratio with a relatively simple structure and the tumble is effectively collapsed in the later stage of the compression stroke.

Figure 21:
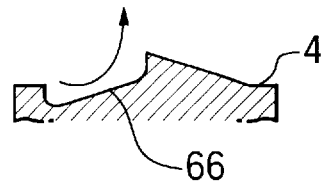
FIG. 21 is a sectional view of a further modification of the cavity.

Further, the bottom surface of the cavity 66 may be inclined to be raised toward the center of the top surface of the piston 4. This structure facilitates the collapse of the tumble component to be directed to the peripheral portion of the piston in the cavity 66 at the later stage of the compression stroke. In addition, with the structure shown in FIG. 21, the injected fuel toward the center in the cavity 66 is directed upward and thus lifted up toward the ignition plug 11. It should however noted that the trapping performance of the atomized air fuel mixture gas is improved in the structure of main embodiment or the pent roof type configuration rather than the structure of FIG. 21.

Although the present invention has been explained with reference to a specific, preferred embodiment, one of ordinary skill in the art will recognize that modifications and improvements can be made while remaining within the scope and spirit of the present invention. The scope of the present invention is determined solely by the appended claims.

What is claimed is:

1. A direct injection ignition engine comprising;
   a piston with a cavity on a top surface thereof;
   an injector arranged at a peripheral portion of a combustion chamber to be faced to the combustion chamber for injecting a fuel directly into the combustion chamber,
   an ignition plug arranged to be projected to the combustion chamber for igniting the fuel introduced into the combustion chamber, an intake passage connected to the combustion chamber for introducing an intake air to the combustion chamber,
   intake air flow control means arranged in the intake passage for controlling an intake air flow of an inclined vortex including a tumble component and swirl component produced in the combustion chamber;
   engine load detecting means for detecting an engine load,
   engine speed detecting means for detecting an engine speed,
   fuel supply control means for injecting the fuel based on the engine load and engine speed from the injector to the cavity in a compression stroke to accomplish a stratified combustion condition in which an air fuel mixture with an air fuel ratio greater than a theoretical one is concentrated around the ignition plug in a first operating condition, and for injecting the fuel from the injector to the cavity in an intake stroke to accomplish a uniform combustion condition in which an air fuel mixture with an air fuel ratio greater than a theoretical one is uniformly and entirely dispersed in the combustion chamber in a second operating condition, and,
   said intake air flow control means producing the inclined vortex of the air fuel mixture in the operating condition from the stratified combustion condition to the uniform combustion condition with the air fuel ratio providing a lean air fuel mixture and controlling the intake gas flow so that a tumble ratio is greater than a swirl ratio in at least the uniform combustion condition of the uniform combustion condition providing a lean air fuel mixture.

2. A direct injection ignition engine as recited in claim 1 wherein the first operating condition is at least in a low engine load and low engine speed condition and wherein the second operating condition is at least in a condition beyond said low engine load and engine speed condition with regard to the engine load and engine speed.

3. A direct injection ignition engine as recited in claim 1 wherein the intake gas flow control means produces the inclined vortex downward of a fuel injecting direction of the injector in the combustion chamber.

4. A direct injection ignition engine as recited in claim 1 wherein the intake gas flow control means produces the inclined vortex with an angle greater than 45° to a plane perpendicular to a center line of a cylinder bore in the uniform combustion condition with air fuel ratio providing a lean air fuel mixture.

5. A direct injection engine as recited in claim 1 wherein the combustion chamber is formed with a ceiling of a pent roof type combustion chamber, wherein the top surface of the piston is of a complementary configuration to that of the ceiling of the combustion chamber, wherein the cavity is formed at a position offset from a center of the top surface toward the injector, wherein the ignition plug is arranged corresponding to a peripheral edge of the cavity and wherein a vertical wall for guiding the fuel injected from the injector in a swirl direction is formed on an upstream portion of a peripheral surface of the cavity defined by a raised portion of the top surface of the piston.

6. A direct injection ignition engine as recited in claim 5 wherein a bottom of the cavity is of a flat surface in a direction substantially perpendicular to the center line of the cylinder bore.

7. A direct injection ignition engine as recited in claim 5 wherein a bottom of the cavity is inclined with regard to a plane perpendicular to the center line of the cylinder bore upward from a peripheral portion to a center of the top surface of the piston in a direction substantially perpendicular to the center line of the cylinder bore.

8. A direct injection engine as recited in claim 1 wherein the intake air flow control means includes a control valve arranged in one of the intake ports for open and close the intake port, wherein a tumble is produced even when the control valve is fully opened and a swirl is enhanced as the control valve is closed, and wherein the intake port is configured to cause a tumble ratio greater than a swirl ratio from an entire closed condition to a full open condition.

9. A direct injection ignition engine as recited in claim 1 wherein the intake gas flow control means controls the intake gas flow so as to intensify a swirl component as the engine load is increased in the stratified combustion condition.

10. A direct injection ignition engine as recited in claim 8 wherein the opening of the control valve is reduced as the engine load is increased in the stratified combustion condition, and the control valve is entirely closed in the uniform combustion condition with an air fuel ratio providing a lean air fuel mixture.

11. A direct injection ignition engine as recited in claim 1 wherein the swirl ratio is obtained through a predetermined formula based on an angular speed of the intake gas in a traverse direction at a distance from a joint surface of a cylinder block and a cylinder head by 1.75 times of a diameter of a cylinder bore,
   and wherein the tumble ratio is obtained through said predetermined formula based on an angular speed of the intake gas flow in a tube,
   the tube with a substantially same diameter as that of the cylinder bore being arranged along the joint surface so that a center line of the tube is located at a distance of the diameter of the cylinder plus 20 mm from the joint surface,
   the tumble being produced by an intake gas supply to the tube through the cylinder head when the intake gas hits against a wall of the tube, and,
   an intensity of the tumble being measured at opposite sides at distances of approximately 3.5 times of the diameter of the cylinder bore from the center of the cylinder bore.

12. A direct injection ignition engine as recited in claim 1 wherein the intake passage is an intake port.

13. A direct injection ignition engine as recited in claim 1 wherein the combustion chamber is defined by a wall surface of a cylinder bore, the top surface of the piston, and a bottom surface of the cylinder head.

14. A direct injection ignition engine comprising;

a piston with a cavity on a top surface thereof;

an injector arranged at a peripheral portion of a combustion chamber to be faced to the combustion chamber for injecting a fuel directly into the combustion chamber, an ignition plug arranged to be projected to the combustion chamber for igniting the fuel introduced into the combustion chamber, an intake passage connected to the combustion chamber for introducing an intake air to the combustion chamber, intake air flow control means arranged in the intake passage for controlling an intake air flow of an inclined vortex including a tumble component and swirl component produced in the combustion chamber;

engine load detecting means for detecting an engine load, engine speed detecting means for detecting an engine speed, fuel supply control means for injecting the fuel from the injector to the cavity in a compression stroke to accomplish a stratified combustion condition in which an air fuel mixture with an air fuel ratio greater than a theoretical one is concentrated around the ignition plug in a first operating condition, and for injecting the fuel from the injector to the cavity in an intake stroke to accomplish a uniform combustion condition in which an air fuel mixture with an air fuel ratio greater than a theoretical one is uniformly and entirely dispersed in the combustion chamber in a second operating condition, and, said intake air flow control means producing the inclined vortex of the air fuel mixture in the operating condition from the stratified combustion condition to the uniform combustion condition with the air fuel ratio providing a lean air fuel mixture, and controlling the intake gas flow so that the inclined vortex is directed downward of a fuel injecting direction of the injector in the combustion chamber.

15. A direct fuel injection ignition engine as recited in claim 14 wherein the first operating condition is at least in a low engine load and low engine speed condition and wherein the second operating condition is at least in a condition beyond said low engine load and engine speed condition with regard to the engine load and engine speed.

16. A direct injection ignition engine comprising;

a piston with a cavity on a top surface thereof;

an injector arranged at a peripheral portion of a combustion chamber to be faced to the combustion chamber for injecting a fuel directly into the combustion chamber, an ignition plug arranged to be projected to the combustion chamber for igniting the fuel introduced into the combustion chamber, an intake passage connected to the combustion chamber for introducing an intake air to the combustion chamber, intake air flow control valve arranged in the intake passage for controlling an intake air flow of an inclined vortex including a tumble component and swirl component produced in the combustion chamber, an actuator for driving the control valve, engine load detecting sensor for detecting an engine load, engine speed detecting sensor for detecting an engine speed, fuel supply controller, based on the output signals from the engine load detecting sensor and the engine speed detecting sensor, for producing control signals for the injector which include a fuel injection amount and fuel injection timing in a compression stroke for accomplishing a stratified combustion condition in which an air fuel mixture with an air fuel ratio greater than a theoretical one is concentrated around the ignition plug in a first operating condition, and, the fuel injection amount and fuel injection timing in an intake stroke for accomplishing a uniform combustion condition in which an air fuel mixture with an air fuel ratio greater than a theoretical one is uniformly and entirely dispersed in the combustion chamber in a second operating condition, and, producing control signals for the actuator to produce the inclined vortex of the air fuel mixture in the operating condition from the stratified combustion condition to the uniform combustion condition with the air fuel ratio providing a lean air fuel mixture and to provide a control amount of the control valve so that a tumble ratio is greater than a swirl ratio in at least the uniform combustion condition of the uniform combustion condition providing a lean air fuel mixture.

17. A direct fuel injection ignition engine as recited in claim 16 wherein the first operating condition is at least in a low engine load and low engine speed condition and wherein the second operating condition is at least in a condition beyond said low engine load and engine speed condition with regard to the engine load and engine speed.

18. A direct injection ignition engine comprising;

a piston with a cavity on a top surface thereof, an injector arranged at a peripheral portion of a combustion chamber to be faced to the combustion chamber for injecting a fuel directly into the combustion chamber, an ignition plug arranged to be projected to the combustion chamber for igniting the fuel introduced into the combustion chamber, an intake passage connected to the combustion chamber for introducing an intake air to the combustion chamber, intake air flow control valve arranged in the intake passage for controlling an intake air flow of an inclined vortex including a tumble component and swirl component produced in the combustion chamber, an actuator for driving the control valve, engine load detecting sensor for detecting an engine load, engine speed detecting sensor for detecting an engine speed, fuel supply controller, based on the output signals from the engine load detecting sensor and the engine speed detecting sensor, for producing control signals for the injector which include a fuel injection amount and fuel injection timing in a compression stroke for accomplishing a stratified combustion condition in which an air fuel mixture with an air fuel ratio greater than a theoretical one is concentrated around the ignition plug in a first operating condition, and, the fuel injection amount and fuel injection timing in an intake stroke for accomplishing a uniform combustion condition in which an air fuel mixture with an air fuel ratio greater than a theoretical one is uniformly and entirely dispersed in the combustion chamber in a second operating condition, and, producing control signals for the actuator to produce the inclined vortex of the air fuel mixture in the operating condition from the stratified combustion condition to the uniform combustion condition with the air fuel ratio providing a lean air fuel mixture and to provide a control amount of the control valve so that the inclined vortex is directed downward of a fuel injecting direction of the injector in the combustion chamber in at least the uniform combustion condition with the air fuel ratio for providing the lean air fuel mixture.

19. A direct fuel injection ignition engine as recited in claim 18 wherein the first operating condition is at least in a low engine load and low engine speed condition and wherein the second operating condition is at least in a condition beyond said low engine load and engine speed condition with regard to the engine load and engine speed.

* * * * *